(12) United States Patent
Georgiadis et al.

(10) Patent No.: US 11,604,341 B2
(45) Date of Patent: Mar. 14, 2023

(54) ENHANCED SAMPLE IMAGING USING STRUCTURED ILLUMINATION MICROSCOPY

(71) Applicant: THERMO ELECTRON SCIENTIFIC INSTRUMENTS LLC, Madison, WI (US)

(72) Inventors: Michael S. Georgiadis, Carlsbad, CA (US); Francis J. Deck, Madison, WI (US)

(73) Assignee: Thermo Electron Scientific Instruments LLC, Madison, WI (US)

(*) Notice: Subject to any disclaimer, the term of this patent is extended or adjusted under 35 U.S.C. 154(b) by 261 days.

(21) Appl. No.: 16/837,512

(22) Filed: Apr. 1, 2020

(65) Prior Publication Data
US 2020/0319446 A1     Oct. 8, 2020

Related U.S. Application Data

(60) Provisional application No. 62/827,921, filed on Apr. 2, 2019.

(51) Int. Cl.
    *G02B 21/00*      (2006.01)
    *G02B 21/36*      (2006.01)
    (Continued)

(52) U.S. Cl.
CPC ........ *G02B 21/0032* (2013.01); *G01J 3/4412* (2013.01); *G01N 21/6458* (2013.01);
(Continued)

(58) Field of Classification Search
CPC ............ G02B 21/0032; G02B 21/0056; G02B 21/006; G02B 21/0072; G02B 21/0076;
(Continued)

(56) References Cited

U.S. PATENT DOCUMENTS 5,587,832 A    12/1996   Krause
6,128,077 A    10/2000   Jovin et al.
(Continued)

OTHER PUBLICATIONS

GAO P et al., "Confocal laser scanning microscopy with spatiotemporal structured illumination", Optics Letters [online], vol. 41, No. 6, Mar. 15, 2016 (May 15, 2016), pp. 1193-1196, Retrieved from: https://www.osapublishing.org/ol/abstract.cfm?uri=ol-41-6-1193.
(Continued)

*Primary Examiner* — Arnel C Lavarias

(57) ABSTRACT

Methods and apparatuses are disclosed whereby structured illumination microscopy (SIM) is applied to a scanning microscope, such as a confocal laser scanning microscope or sample scanning microscope, in order to improve spatial resolution. Particular aspects of the disclosure relate to the discovery of important advances in the ability to (i) increase light throughput to the sample, thereby increasing the signal/noise ratio and/or decreasing exposure time, as well as (ii) decrease the number of raw images to be processed, thereby decreasing image acquisition time. Both effects give rise to significant improvements in overall performance, to the benefit of users of scanning microscopy.

22 Claims, 6 Drawing Sheets

(51) Int. Cl.
  *G01N 21/64* (2006.01)
  *G01N 21/65* (2006.01)
  *G01J 3/44* (2006.01)

(52) U.S. Cl.
  CPC ......... *G01N 21/658* (2013.01); *G02B 21/006* (2013.01); *G02B 21/008* (2013.01); *G02B 21/0056* (2013.01); *G02B 21/0072* (2013.01); *G02B 21/0076* (2013.01); *G02B 21/367* (2013.01)

(58) Field of Classification Search
  CPC .... G02B 21/008; G02B 21/367; G02B 21/00; G02B 21/0004; G02B 21/002; G02B 21/0024; G02B 21/0036; G02B 21/0052; G02B 21/0064; G02B 21/06; G02B 21/36; G02B 21/361; G01N 21/6458; G01N 21/658; G01N 21/64; G01N 2021/6417; G01N 21/6456; G01N 2021/6463
  USPC ....... 359/385, 362, 363, 368, 369, 370, 371, 359/386, 388, 389, 390
  See application file for complete search history.

(56) References Cited

U.S. PATENT DOCUMENTS

| | | | |
|---|---|---|---|
| 6,883,952 B2 | 4/2005 | Sander | |
| 7,561,326 B2 | 7/2009 | Funk et al. | |
| 8,237,835 B1 | 8/2012 | Muller | |
| 8,704,196 B2 | 4/2014 | Wolleschensky et al. | |
| 8,817,088 B2 | 8/2014 | Hayashi | |
| 9,348,127 B2 | 5/2016 | Kempe et al. | |
| 9,360,660 B2 | 6/2016 | Yi et al. | |
| 9,395,293 B1 | 7/2016 | Acosta et al. | |
| 9,444,981 B2 | 9/2016 | Bellis et al. | |
| 9,651,766 B2 | 5/2017 | Kleppe et al. | |
| 9,726,877 B2 | 8/2017 | Kleppe et al. | |
| 9,874,737 B2 | 1/2018 | Best et al. | |
| 9,885,859 B2 | 2/2018 | Harris | |
| 11,287,625 B2 * | 3/2022 | Fujikake | G02B 21/0076 |
| 2006/0011857 A1 | 1/2006 | Funk | |
| 2015/0192461 A1 | 7/2015 | Chen | |
| 2015/0260978 A1 | 9/2015 | Cremer et al. | |
| 2016/0216505 A1 | 7/2016 | Okudaira et al. | |
| 2018/0238803 A1 * | 8/2018 | Osawa | G02B 21/082 |
| 2018/0267289 A1 | 9/2018 | Kalkbrenner et al. | |
| 2018/0292634 A1 | 10/2018 | Ricco et al. | |
| 2021/0389577 A1 * | 12/2021 | Fujikake | G02B 21/06 |

OTHER PUBLICATIONS

PCT/US2020/026143, International Search Report and Written Opinion, dated Jul. 15, 2020, 9 pages.

Dong S, et al., "Resolution doubling with a reduced No. of image acquisitions", Biomedical Optics Express, vol. 6, Issue 8, pp. 2946-2952 (Jul. 17, 2015).

Heintzmann R, "Saturated patterned excitation microscopy with two-dimensional excitation patterns", Micron, vol. 34, Issues 6-7, pp. 283-291 (Oct. 2003).

Watanabe K, et al., "Structured line illumination Raman microscopy", Nat Commun. Dec. 2, 2015;6:10095. doi: 10.1038/ncomms10095. PMID: 26626144; PMCID: PMC4686755.

Hirano Y, et al., "Recent advancements in structured-illumination microscopy toward live-cell imaging", Microscopy, vol. 64, Issue 4, pp. 237-249, (Aug. 2015).

Huang Y, et al., "Laser scanning saturated structured illumination microscopy based on phase modulation", Optics Communications, vol. 396, pp. 261-266, (Aug. 1, 2017).

Kim Y-D, "Structured illumination confocal scanning microscope with enhanced optical resolution and acquisition speed", Proceedings vol. 8228, Single Molecule Spectroscopy and Superresolution Imaging V; 822812 (2012), https://doi.org/10.1117/12.907188.

* cited by examiner

ENHANCED SAMPLE IMAGING USING STRUCTURED ILLUMINATION MICROSCOPY

CROSS-REFERENCE TO RELATED APPLICATIONS

The present application claims the priority benefit from U.S. Patent Application Ser. No. 62/827,921, filed Apr. 2, 2019, which is hereby incorporated by reference herein in its entirety for all purposes.

FIELD OF THE INVENTION

The present invention relates to the imaging of samples using a scanning microscope (e.g., a confocal laser scanning or sample scanning microscope) and structural illumination for resolution improvement.

BACKGROUND OF THE INVENTION

Conventional light microscopes have a spatial resolution that is limited by diffraction. When the back aperture of a microscope objective is fully filled with collimated light, the image in the focal or sample plane is an Airy disk having a radius $r_{airy}$ (in nanometers, nm) according to:

$$r_{airy} = \frac{1.22 * \lambda}{2 * NA},$$

in which $\lambda$ (in nm) is the illuminating wavelength and NA (dimensionless) is the numerical aperture of the microscope objective and provides a measure of its resolving power. Related to this quantity is the resolution of a microscope, which is commonly defined as the smallest distance between two objects that enables them to be imaged separately, as opposed to a single object. If a sample is imaged by sweeping an Airy Disk beam over it, then the resolution of the resulting image is given by:

$$r = \frac{\lambda}{2 * NA} = \frac{\lambda}{2 * n * \sin(\theta)},$$

where r in this case is the resolution (in nm), $\lambda$ and NA are as defined above, n is the index of refraction of the ambient medium, and $\theta$ is the half-angle of the maximum cone of light that can enter or exit the lens. As is apparent from this equation, spatial resolution can be improved (i.e., the value of "r" can be decreased) by either decreasing the wavelength of the illuminating light or increasing the numerical aperture of the objective. However, this applies only to the situation in which a linearly polarized beam fills the entire back aperture of a microscope objective. By filling only certain engineered parts, an interference pattern, as opposed to an Airy disk, can be generated and swept over the sample surface. Importantly, the fringe spacing of the interference pattern is comparatively smaller than the diameter of the Airy disk. Such engineered illumination patterns and their resulting detection and reconstruction algorithms are referred to in the art as "structured illumination," a technique that can improve the microscope resolution by up to a factor of two.

Structured Illumination Microscopy (SIM) systems are available commercially on a variety of fluorescence microscopes. However, these SIM systems use "wide field" illumination, which refers to the illumination of a large sample area by sending the collimated light source through a focusing lens before entering the objective. The normal intent of fluorescence imaging is not to collect an entire spectrum, but rather to simply filter the emission light for the wavelength of interest and then direct it into a camera. Whereas wide field microscopy is suitable in a variety of fluorescence imaging applications, there are also cases in which a confocal microscope is superior. Confocal microscopes utilize a pinhole to reject light that is out of focus, thereby vastly improving imaging through thick samples. Since a confocal image is constructed pixel-by-pixel, rather than over a large area (as in wide field imaging), confocal microscopy is well adapted for spectroscopic imaging, because the emission or scattered light can be sent into a spectrograph downstream of the pinhole. Specific uses for confocal microscopy include fluorescence sectioning through thick, non-homogenous samples, as well as hyperspectral imaging, such as in the case of imaging Raman microscopy.

Because confocal microscopes do not illuminate an entire sample at once, as in the case of a wide-field microscope, existing SIM systems and their reconstruction algorithms are not directly "drop-in" compatible with confocal microscopes. However, a particular application of SIM to confocal laser scanning microscopy (CLSM) is described in Gao et al. (OPTICS LETTERS (2016) Vol. 41, No. 6: 1193-96). According to this publication, a sample is scanned point-by-point, multiple times using fringe patterns generated from the concentration of two "circular pupils" of light through the microscope objective. More particularly, these fringe patterns are characterized by their direction index m, referring to the angle of the line connecting the pupils, and phase shift n of one of the two pupils relative to the other. The use of 4 different angles and 4 different relative phases requires the collection of 16 raw images to reconstruct an enhanced image. The present state of the art would benefit from improvements in the application of SIM to scanning microscopy, such as CLSM, particularly in terms of performance efficiency.

SUMMARY

Aspects of the invention are associated with methods and apparatuses whereby structured illumination microscopy (SIM) is applied to a scanning microscope, such as a confocal laser scanning microscope or confocal sample scanning microscope, in order to improve spatial resolution. Particular aspects relate to the discovery of important advances in the ability to (i) increase light throughput to the sample, thereby increasing the signal/noise ratio and/or decreasing exposure time, as well as (ii) decrease the number of raw images to be processed, thereby decreasing image acquisition time. Both effects give rise to significant improvements in overall performance, to the benefit of users of scanning microscopes.

According to particular methods for imaging a sample in which SIM is applied to a confocal microscopy, an interference fringe, or focused fringe pattern, is scanned over a sample area or, more particularly, generated on discreet points of the sample, such as at regular intervals over this area. The focused fringe pattern is generated by sending laser beams into two sides of a microscope objective at a given angle and phase difference between the two beams. The angle and phase can be varied, for example, using a spatial light modulator such as a known programmable device that can modulate the wave front of a light beam on a pixel-by-pixel basis. A common type used for phase modulation is a liquid-crystal-on-silicon spatial light modulator (LCOS-SLM), which operates in a manner similar to that of an LCD display, i.e., the liquid crystals change their refractive index under an applied electric field, resulting in a phase delay as light interacts with the crystals. The spatial light modulator can utilize a computer as a secondary display, such that a color pattern is converted into phase stroke. For example, in the case of an 8-bit color pattern, 128 and 256 may represent respective phase delays of $\pi$ and $2\pi$. If the light is directed to only the edges of the microscope objective back aperture, the two beams will constructively and destructively interfere with each other on the sample, resulting in a sinusoidal pattern with a period that is about half of the diameter of the Airy disk described above. This provides the basis for gaining additional resolution of the image using SIM, compared to conventional confocal microscopy.

However, a raw image obtained from a single, given angle and phase is not sufficient to reconstruct a fully resolved image. Rather, to build an image, the laser generating the light beams is swept over the sample and imaged through a confocal pinhole multiple times, for example at each of a series or predetermined set of discreet angles and phases. That is, the illumination pattern of the two beams, corresponding to illumination areas on the back (rear) aperture of the microscope objective, is projected at these angles and phases. At a given angle, such as 0 radians, two or more phase images may be collected, for example using a spatial light modulator to retard the phase of one of the beams relative to the other. One image at phase shift of 0, and other images at the same angle but with non-zero phase shifts, such as $\pi/2$, $\pi$, $3\pi/2$ radians relative to each other, together with images corresponding to other focused fringe patterns at other combinations of angles and phases, can be used to synthesize (reconstruct), pixel-by-pixel, the entire scanning confocal image of the particular sample area of interest. In this manner, in scanning microscopy such as confocal microscopy, the use of SIM can advantageously improve spatial resolution (reduce the value of "r" in the equation above) by a factor of greater than about 1.5, such as by a factor from about 1.8 to about 2.0.

Particular aspects of the invention relate to the discovery of parameters that allow significantly improved light throughput throughout the system, by using an illumination pattern of the two beams, such that corresponding illumination areas of the microscope objective are non-circular. In the case of circular areas, the two beams with a circular profile generate a sinusoidal pattern on the sample along a displacement axis of the two circles, with this displacement axis referring to the line through the center of the two circles. A key factor in generating the best sinusoid on the sample is the length or distance of the displacement of the two circles along their axis. Importantly, the presence (or absence) of light above or below the circles, which nonetheless maintains the displacement distance, does not impact the quality of the sinusoid generated on the sample. Therefore, rather than illuminating with only two circles, the back aperture can be further illuminated at areas exterior to the circles, in order to augment to quantity of light introduced without sacrificing image quality.

For example, "illumination augmentation areas" can be formed with slit-shaped illumination areas, in which the maximum slit width is the same as the diameter of circular "pupils" that represent the largest inscribed circles within the slit. The additional light brought in through the microscope objective also interferes to form the sinusoidal focused fringe pattern at the selected angle and phase. In a particular embodiment, illumination areas in the form of slits, or circular segments of a much larger circle that corresponds to the rear circular aperture of the microscope objective, provide illumination augmentation areas outside of (exterior to) the largest inscribed circles, which serve to increase light throughput that can advantageously increase the signal/noise ratio and/or decrease exposure time. This is significant for the overall performance of a confocal or other scanning microscope, because conventionally light throughput is very limited, as most of the light generated by the laser is not directed into the objective. Advantageously, the change to the use of one or more (and preferably both of two) non-circular illumination areas is easily implemented. The corresponding, dramatic (e.g., four fold) increase in light throughput allows for image collection at an equivalent signal/noise ratio but with a lower camera exposure time, compared to using reference or baseline circular areas represented by the largest inscribed circles within the illumination areas. As a result, the overall image acquisition time is decreased, providing a variety of benefits to users in the field of scanning microscopy. According to other embodiments, non-circular illumination areas can be structured to provide the same total illumination as a reference or baseline circular areas, but with largest inscribed circles that are smaller compared to these reference or baseline circular areas. This allows for an increased spacing of the areas along the displacement axis, having the effect of increasing image quality.

Other aspects relate to the discovery that, in the application of SIM to a confocal laser scanning microscope or sample scanning microscope, there is no mathematical limitation that necessitates the collection of images at three phases per angle, and in fact no more than two phases of illumination can be sufficient, as demonstrated in both 1D and 2D physical optical propagation simulations. The immediate impact of this is a reduction in the total number of raw images to be acquired, meaning that the overall image acquisition time is likewise reduced. For example, compared to techniques using four phases per angle (e.g., collecting 16 images total, with four separate angles) or even only three phases per angle (e.g., collecting 9 images total, with three separate angles), image acquisition time can be reduced by about 50% or by about 33%, respectively. Such acquisition time improvement is substantial, not only because time is valuable to users, but also because the decrease in image acquisition time reduces the susceptibility of the system to thermal drift or vibrations, which in turn can cause significant aberrations in the image. Image quality is thereby increased. Acquiring fewer raw images also decreases software overhead requirements for their management, tracking, and storage. Accordingly, the benefits of SIM in improving spatial resolution, for example by a factor of 1.8 or more by using a high numerical aperture (NA) objective, can be achieved at a significantly reduced cost, compared to the use of known methods and apparatuses.

These and other embodiments, directed to methods and apparatuses utilizing SIM to improve image resolution, for example in performing hyperspectral imaging, such as in imaging Raman spectroscopy, or otherwise label-based imaging, such as in fluorescence microscopy, will become apparent from the following Detailed Description.

Figure 1A:
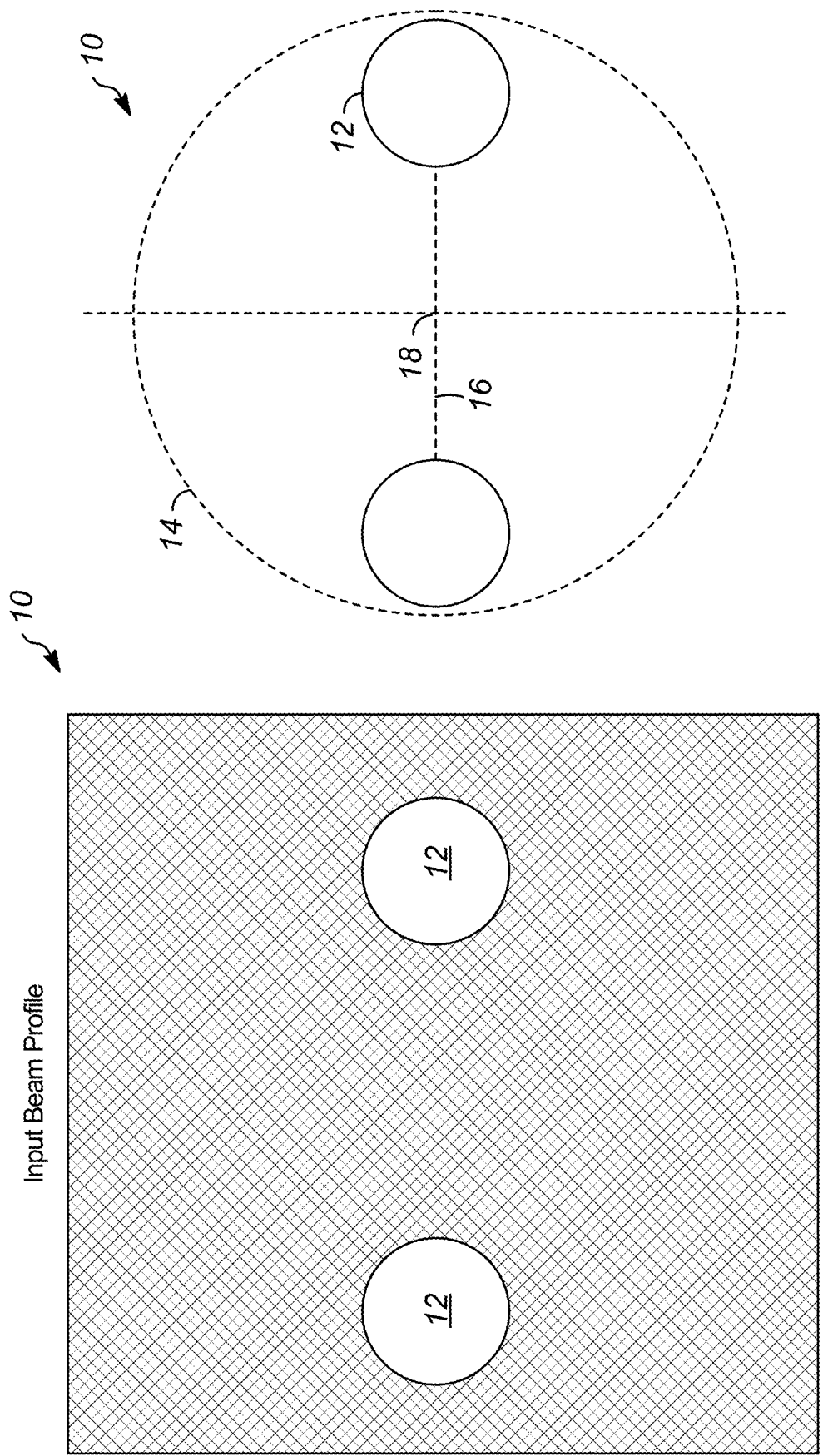
FIGS. 1A and 1B are input beam profiles, or illumination areas of a back aperture of a microscope objective, in the form of circles (FIG. 1A) and slits, or segments of circles having a larger diameter (FIG. 1B).

The figures should be understood to present illustrations of embodiments of the invention and/or principles involved, with the same numbers being used among the figures to designate the same or similar elements. As would be apparent to one of skill in the art having knowledge of the present disclosure, other methods and apparatuses using SIM will have associated steps and components determined, in part, according to specific imaging applications.

DETAILED DESCRIPTION OF EMBODIMENTS

Representative embodiments of the invention are directed to methods of imaging a sample, by illuminating a plurality of points of the sample, such as over an area of interest, with multiple focused fringe patterns (or interference fringes) that are generated from light beams directed about rotational axes at various angles and shifted in phase relative to one another by various phases. Accordingly, these multiple focused fringe patterns may be designated as a "first focused fringe pattern," "a second focused fringe pattern," "a third focused fringe pattern," etc., with the terms "first," "second," "third," etc. being used merely to indicate that these focused fringe patterns are associated with characteristics, namely their respective characteristic rotational axis angles and phase shifts (e.g., corresponding to angles of "a first rotational axis," "a second rotational axis," "a third rotational axis," etc., or shifts of "a first phase," "a second phase," "a third phase," etc.), of the light beams that interfere to generate them. These terms are not meant to be construed as requiring a particular order in which the focused fringe patterns are generated. Nor are these terms to be construed as necessarily requiring different values of angle and/or phase. In fact, according to preferred embodiments, some focused fringe patterns, used to illuminate a given sample at a plurality of points, are generated from light beams having the same rotational axis angle as (having a rotational axis that substantially coincides with that of) light beams used to generate other focused fringe patterns, but which other focused fringe patterns are generated with light beams being shifted by a different phase. As described in greater detail herein, this rotational axis angle refers to the orientation of separate illumination areas on the back aperture of the microscope, which are illuminated by these beams. Likewise, some focused fringe patterns may be generated from light beams shifted by the same phase as light beams used to generate other focused fringe patterns, but which other focused fringe patterns are generated from light beams having a different rotational axis angle. Therefore, for any two focused fringe patterns used to illuminate the sample, these may differ with respect to their characteristic rotational axis angles only, their characteristic phase shifts only, or both their characteristic rotational axis angles and phase shifts.

The terms "light" and "light beam," particularly in the context of light emitted through, and focused by, the microscope objective and providing illumination areas on the rear aperture of the objective, refer to electromagnetic radiation of any wavelength, but preferably having a wavelength, $\lambda$, ranging from the ultraviolet (UV) portion of the electromagnetic spectrum to the mid-infrared portion of the electromagnetic spectrum, for example in the range from about 200 nm to about 11 μm. Often, visible light will be used, having a wavelength, for example from about 380 nm to about 750 nm. Unless indicated otherwise, all angles are given in radians, whereby $2\pi$ radians=360°.

Methods described herein utilize structural illumination microscopy (SIM), for example in the case of confocal-SIM when specifically applied to confocal laser scanning microscopy (CLSM). According to such methods, a plurality of points of the sample of interest are illuminated, not by a laser beam occupying the entire back aperture of the microscope objective as in the case of conventional confocal microscopy, but rather with a sinusoidal, focused fringe pattern generated by the interference of two or more, but preferably only two, light beams (e.g., collimated laser beams) that are emitted through, and focused by, the microscope objective. In particular, these light beams fill only a portion, such as engineered illumination areas, of the back aperture of the objective. These areas, from which the beams are focused by the microscope objective and emitted onto the sample, may for example, be at opposite ends of a diameter of the back aperture. A given focused fringe pattern may be scanned or swept over the sample area and used to obtain illumination data, for example at discreet sample intervals corresponding to a given sample frequency, such as several samples per micrometer. The illumination data may be, for example, intensity values obtained from a single element detector or otherwise spectra obtained from a spectrograph.

Figure 1B:
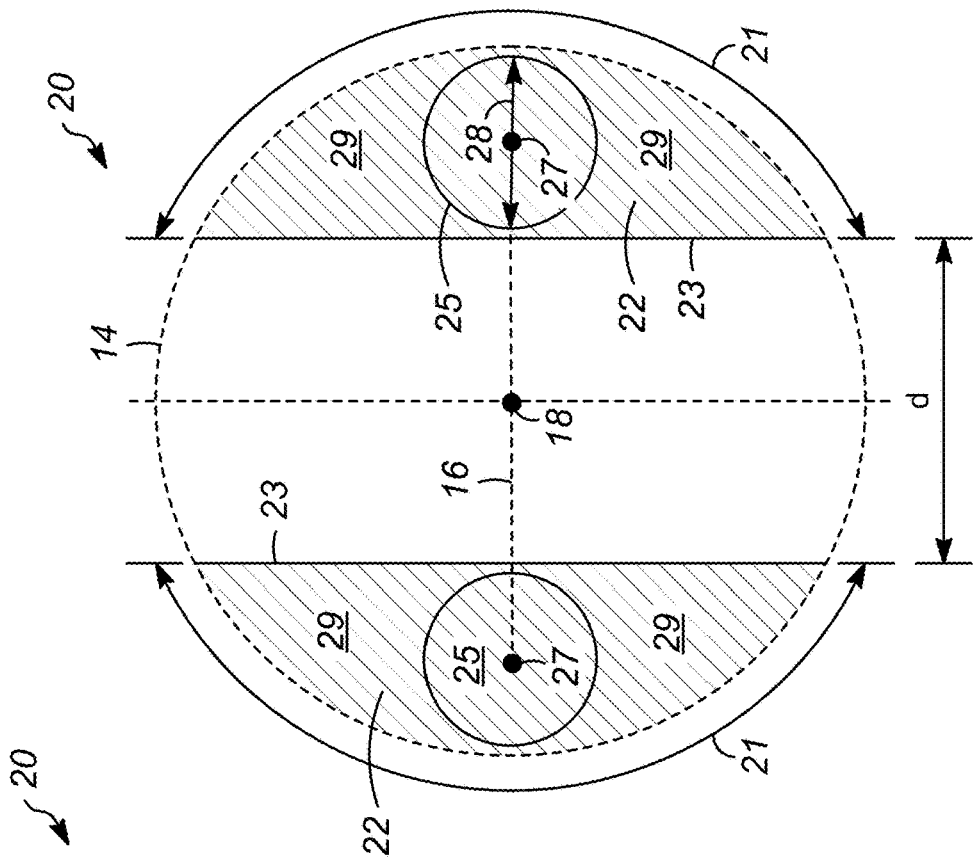
Figure 1B:
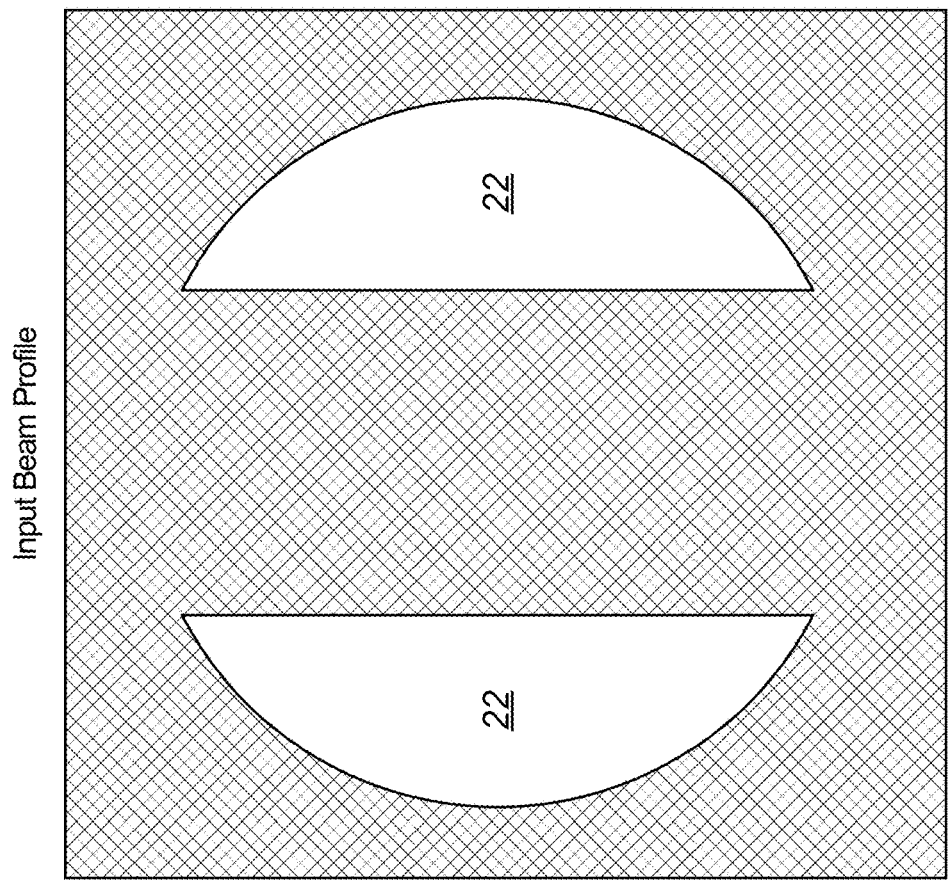

FIGS. 1A and 1B, for example, provide two illustrations of respective input beam profiles 10, 20 with corresponding, respective illumination areas 12, 22 of light beams projected onto a back aperture 14 of a microscope objective. The left-hand illustrations show these light beams as white areas (circles in the case of FIG. 1A and slits in the case of FIG. 1B) illuminating the back aperture, which is otherwise completely dark. The right-hand illustrations remove these dark backgrounds, in order to show additional details. In the embodiments of FIGS. 1A and 1B, the beams are, as described above, emitted from opposite ends of a diameter of a back aperture 14 of the microscope, with this diameter coinciding with a displacement axis 16, along which the beams are spaced or separated. The beams therefore illuminate only "illumination areas" that represent, in a combined amount, less than the area of the aperture. Generally, by configuring these illumination areas 12, 22 such that they are disposed proximate edges of the rear aperture 14, or conform to at least a portion of these edges, to attain the highest possible separation distance, image quality can be improved. In particular, the quality of the sinusoid that is generated on the sample, by interference of the light beams providing these illumination areas 12, 22 is a function of the distance between them, with a greater distance resulting in a higher quality.

In the embodiment of FIG. 1A, these illuminations areas 12 are in the form of circles or pupils and are spaced apart along a displacement axis 16 that also includes the center 18 of back aperture 14. FIG. 1B depicts a different input beam profile 20 with separate illumination areas 22 being non-circular (unlike those shown in FIG. 1A). These areas include largest inscribed circles 25, i.e., corresponding to the largest circles that may be inscribed within these respective illumination areas 22, and, in the illustrated embodiment, equivalent in area to the entire circular illumination areas 12 of FIG. 1A. Accordingly, largest inscribed circles 25 may have respective centers 27 being collinear, along displacement axis 16, with center 18 of back aperture 14. In the case of the largest inscribed circles not having such collinear centers, then the term "largest inscribed circles," insofar as it applies to the corresponding illumination areas, may in some embodiments, but does not necessarily, refer to the largest inscribed circles having such collinear centers (i.e., collinear with center 18 of back aperture 14).

As is also apparent from non-circular illumination areas 22 shown in FIG. 1B, these further include illumination augmentation areas 29, which refer to any illuminated areas outside of largest inscribed circles 25, which are not closer, along the direction of displacement axis 16, i.e., in the horizontal direction as depicted in FIG. 1B, than any part of largest inscribed circles 25. Light in such illumination augmentation areas 29, meeting these requirements, advantageously serves to increase light throughput without sacrificing image quality (resolution). In contrast, light in between the two chords 23 of circular segment- or slit-shaped illumination areas 22, while increasing light throughput, would nonetheless decrease resolution by moving the engineered illumination pattern in the direction of conventional confocal microscopy, in which the entire back aperture is illuminated. In view of this description, it can be appreciated that illumination areas 22 that are circular segments (i.e., areas bounded by an edge and a chord of a circle) provide maximum illumination augmentation areas for any given diameter of largest inscribed circles 25, with this diameter, in turn, defining a given displacement distance and consequently a given degree of resolution. According to the preferred embodiment of FIG. 1B, chords 23 of illumination areas 22 in the shape of slits or circular segments are parallel and separated by displacement distance d which, in this manner, impacts both light throughput and resolution, in the manner described above. Also in this preferred embodiment, slit-shaped illumination areas 22 conform to opposite side portions or arcs 21 of circular back aperture 14 of the microscope objective, such that these areas define circular segments that include (i) arcs 21 conforming substantially to arcs, or these opposite side portions 21, of circular back aperture 14, as well as (ii) chords 23, also defining chords of this circular back aperture 14. Furthermore, it can be seen in this embodiment that diameter 28 of largest inscribed circles 25 corresponds to the slit width at its widest point, which in this case is along displacement axis 16.

In general, the use of any non-circular illumination areas that provide illumination augmentation areas can improve the tradeoff that is implicated in applying SIM to confocal microscopy. This is namely the tradeoff between (i) increasing displacement distance, which increases the fineness of the generated fringe pattern and consequently the resolution of the generated image, at the expense of (ii) decreasing light throughput, which decreases the signal/noise ratio and/or increases exposure time. That is, the illumination augmentation areas advantageously compensate for (ii) without impacting (i), or alternatively allow improvement of (i) without impacting (ii). Advantageously, the illumination augmentation areas can represent a substantial proportion of the entire illumination areas and thereby increase a baseline amount of light throughput from the largest inscribed circles, for example by a factor of at least about 1.5 (e.g., from about 1.5 to about 6.0) or at least about 2.0 (e.g., from about 2.0 to about 5.0), with this factor representing the ratio of the total illumination area to the area of the largest inscribed circles. In the case of slit-shaped illumination areas, for example, this ratio increases as the ratio of the diameters of the largest inscribed circles, in this case the slit width across the displacement axis, to the ratio of the diameter of the back aperture decreases, i.e., as the slits become smaller relative to the back aperture. For example, slit-shaped illumination areas having a slit width of $3/8^{th}$, $1/4^{th}$, or $1/8^{th}$ of the width of the back aperture provide light from illumination augmentation areas representing respectively 59%, 68%, or 78% of the entire illumination areas, such that the factor of increase over the baseline amount is respectively 2.4, 3.1, or 4.5. In the particular case of such circular segment- or slit-shaped illumination areas, the ratio of the slit width to the diameter of the back aperture is generally from about 0.02 to about 0.4, typically from about 0.05 to about 0.3, and often from about 0.1 to about 0.25.

It can be appreciated from the present disclosure that numerous possible, non-circular shapes of illumination areas can advantageously allow light throughput from illumination augmentation areas as described herein. For example, a lens shape (football cross section), polygonal shape, or rounded polygonal shape may be used. In some cases, such as in the case of lens shaped illumination areas, all of the illumination areas outside of their largest inscribed circles may meet the meet the characteristics of "illumination augmentation areas" as defined above. In other cases, the shapes of the non-circular illumination areas may provide illumination areas outside of their largest inscribed circles, which would not meet the characteristics of "illumination augmentation areas" as defined above. Regardless of the particular shape, preferably (i) at least about 85%, at least about 95%, or all, of the illumination areas outside of the largest inscribed circles are "illumination augmentation areas," (ii) the illumination augmentation areas represent at least about 50% (e.g., from about 50% to about 95%), at least about 75% (e.g., from about 50% to about 90%), or at least about 80% (e.g., from about 80% to about 90%) of the entire illumination areas, (iii) the largest inscribed circles have centers substantially coinciding with the displacement axis and are therefore substantially collinear with the center of the back aperture, and/or (iv) the entire illumination areas represent less than about 25% (e.g., from about 1% to about 25%) or less than about 15% (e.g., from about 2% to about 15%) of the area of the back aperture.

Figure 1C:
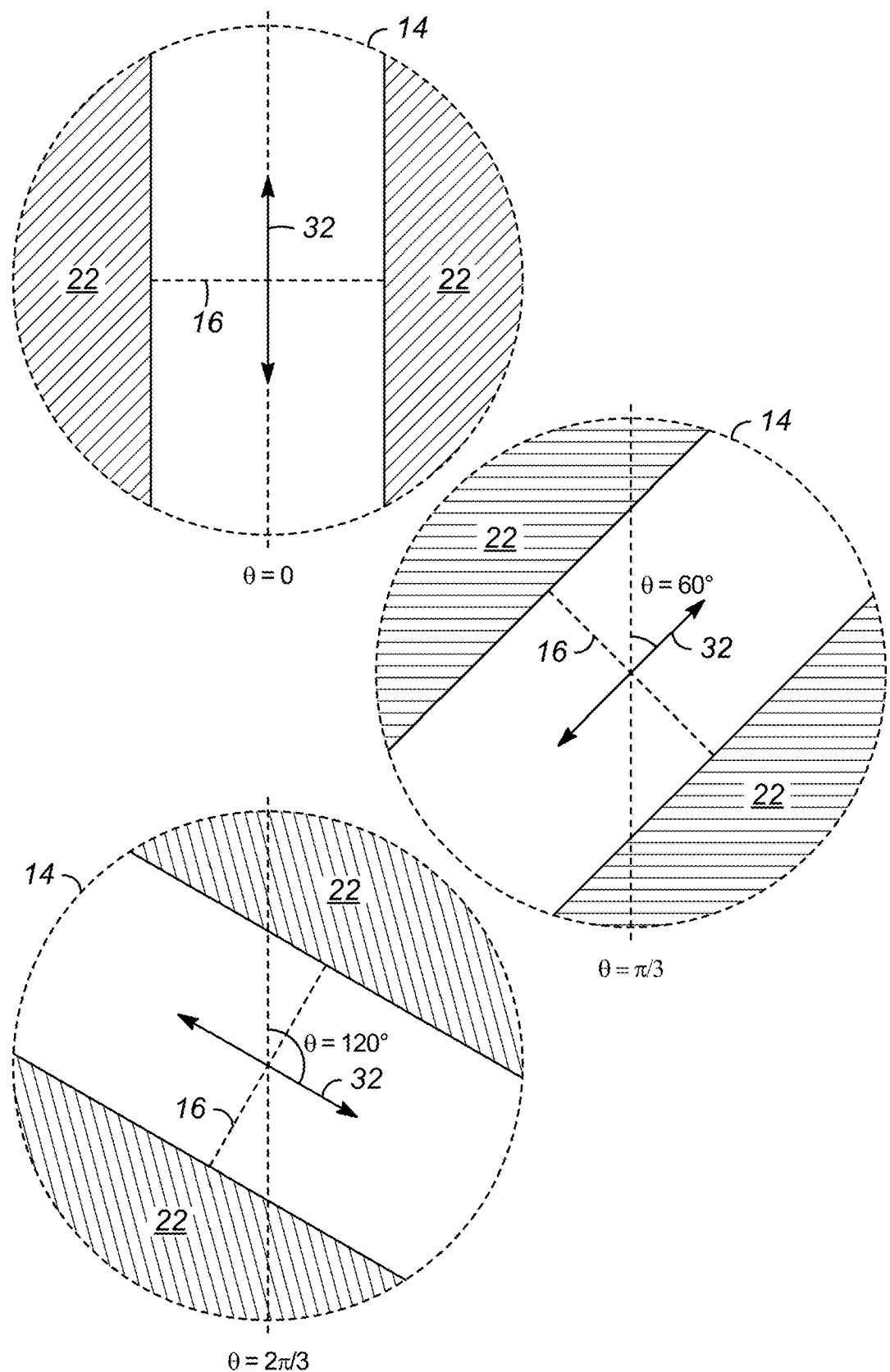
FIG. 1C illustrates an input beam profile as shown in FIG. 1B having a rotational axis at different angles.

FIG. 1C, as in FIG. 1B, likewise illustrates slit-shaped illumination areas 22 separated along displacement axis 16 that coincides with a diameter of back aperture 14 of a microscope objective. Further illustrated in FIG. 1C is a rotational axis 32 that is perpendicular to displacement axis 16. According to this embodiment, rotational axis 32 extends between, and does not intersect, separate illumination areas 22 and coincides with an axis of symmetry about which illumination areas 22 are mirror images of one another. Representative angles of rotational axis 32, as shown in this figure, are 0 (0°), π/3 (60°), and 2π/3 (120°), and the interfering beams emitted at these different angles result in different focused fringe patterns, which are namely generated from different directions. By scanning or sweeping a sample surface with focused fringe patterns in which the characteristic angle of the rotational axis is varied, this allows for image resolution enhancement along the different directions. Accordingly, with the different angles of rotational axes of 0, π/3, and 2π/3, as shown in FIG. 1C, image resolution enhancement may be achieved for the entire space. In some embodiments, therefore, a sample may be scanned or swept with multiple focused fringe patterns, whereby points of the sample are illuminated first, second, and third times with focused fringe patterns having different, first, second, and third rotational axes (e.g., 0, π/3, and 2π/3). However, for imaging applications in which resolution enhancement along a given direction is not necessary, sample illumination with focused fringe patterns having two different rotational axes, or even only one rotational axis, may be deemed sufficient. Whereas in FIG. 1C, the vertical direction specifically corresponds to an angle of rotational axis 32 of 0, it can be appreciated that this is an arbitrary direction and that the primary consideration resides in the ability to enhance image resolution along a desired direction, or a combination of different directions, using a combination of different focused fringe patterns for which the separate illumination areas have different rotational axes.

Figure 2:
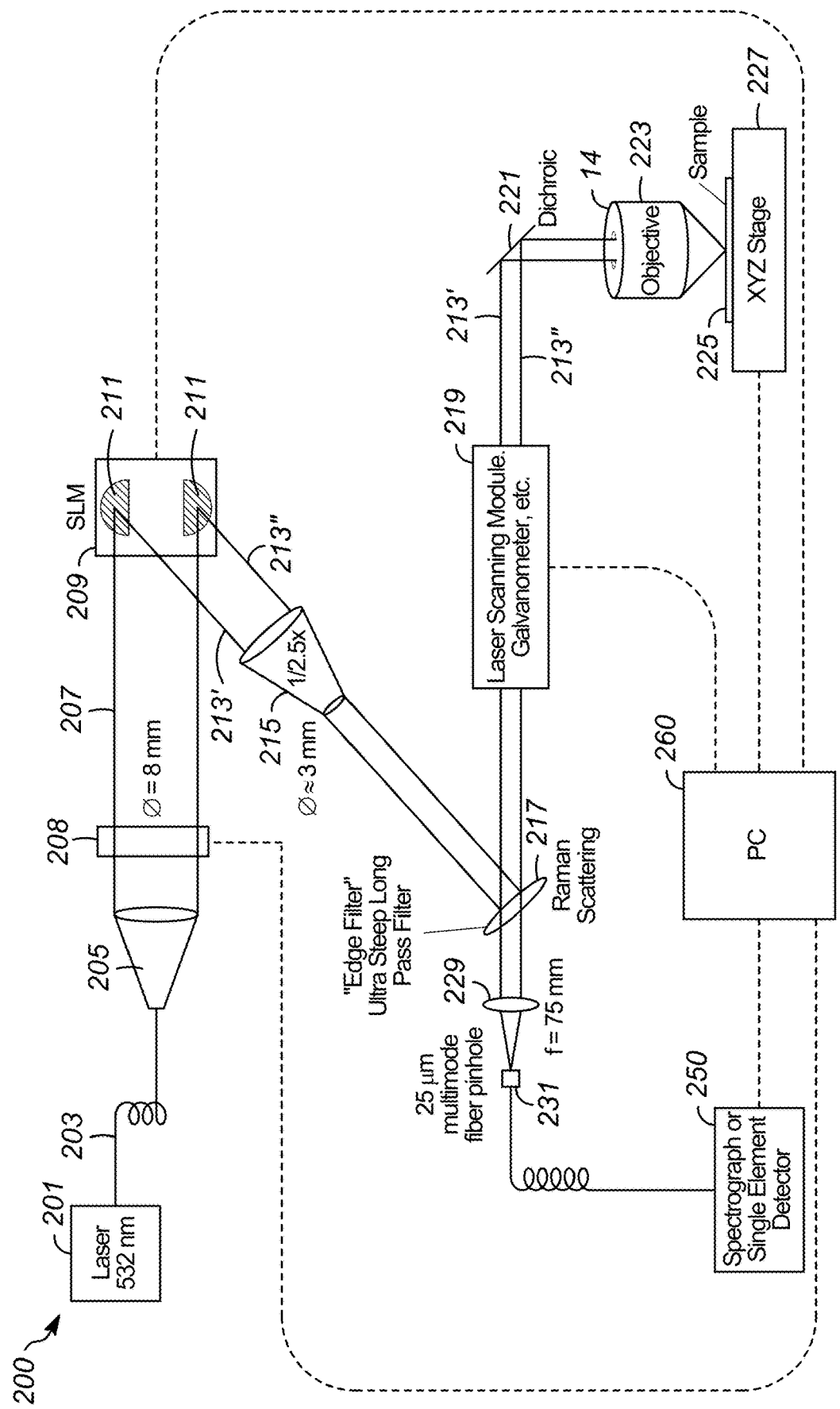
FIG. 2 is a schematic of a confocal scanning microscope utilizing SIM (confocal-SIM) for sample imaging with improved resolution.

FIG. 2 illustrates a confocal scanning microscope (e.g., a confocal laser scanning microscope) 200 and its operation utilizing structural illumination microscopy (SIM) for sample imaging with improved resolution. A laser 201, through polarization maintaining optical fiber 203 and fiber collimator 205, provides a beam 207 of horizontally polarized and collimated light, for example with a beam diameter from about 2 mm to about 20 mm, such as from about 5 mm to about 15 mm. This beam is directed to spatial light modulator (SLM) 209, which may be an electrically programmable device that modulates light according to a fixed spatial (e.g., pixel) pattern. In particular, programmed information for an address of each pixel changes its optical characteristics, providing the appropriate modulation of the incoming or readout light. In this case, SLM 209 is used to modify the phase of this light, in particular by displaying phase gratings 211 that result in diffraction. Combined SLM 209 and phase gratings 211 project light patterns according to the desired illumination areas and rotational axis orientations, described above, following the passage of modulated light beams 213', 213" exiting SLM, through additional equipment and onto back aperture 14 of microscope objective 223. Such additional equipment may include (i) beam compressor 215, for example a variable beam compressor configured for reducing the beam separation to within the diameter of back aperture 14; (ii) edge filter 217 for differentiating excitation wavelengths from emitted wavelengths, (iii) laser scanning module 219 with galvanometers for manipulation and movement of the beams, and (iii) dichroic mirror 221 with appropriate reflection/transmission properties. Objective 223 may use air, having a refractive index of 1, as the ambient medium. Otherwise, objective 223 may operate with a medium having a higher refractive index (e.g., from about 1.2 to about 1.6), such as oil in the case of an oil immersion objective, thereby increasing the resolving power of the microscope.

SLM 209 can display 2-D patterns (images) corresponding to non-circular illumination areas 22 shown in FIG. 1B. In some embodiments, blurring may be used to reduce diffraction occurring at edges, or "soften" these edges, of the displayed pattern (e.g., edges of a circular segment pattern). Blurring may be attained, for example, by performing a convolution of the image with a Gaussian kernel of a certain standard deviation, with a larger standard deviation resulting directionally in greater blurring of the resulting image. Image blurring prior to its display on the SLM 209 or other phase modulating device may be achieved by applying a software algorithm known as a Gaussian blurring filter 208. SLM 209 may be, for example, a phase-only SLM or otherwise a combined amplitude-phase SLM, having the additional capability of modulating amplitude. A phase-only SLM displays a phase grating that results in diffraction of the emitted light. Amplitude modulation can be achieved, however, by selecting locations where the phase grating pattern is and is not displayed. For example, if the generation of a slit-shaped pattern were desired, the SLM could be configured to display a grating pattern in this shape, and no grating elsewhere. Light diffracted from the grating in this case would have a slit-shaped amplitude profile, and the 0th order diffraction beam would have a negative image of the slit. Because the SLM is also capable of modulating the phase on top of the grating pattern, a phase delay (e.g., a phase retardation of π) could be added to one of the two slits.

SLM 209, in particular, can be used (e.g., programmed) to modulate a shift in phase of one light beam 213' projected onto, and emitted through, objective 223, relative to another light beam 213". The modulated light beams 213', 213" are namely used to provide illumination areas, such as those illumination areas 22 as depicted in FIGS. 1A-1C. As described with respect to these figures, and further in view of FIG. 2, beams 213', 213" are focused by objective 223 and interfere on sample 225 to generate focused fringe patterns having different rotational axis angles and/or phase shifts between the beams, as described above. Each focused fringe pattern is used to scan a plurality of points of sample 225 and collect illumination data for corresponding raw images. This may be carried out, for example, using detector 250 to detect emitted light downstream of focusing lens 229 and confocal pinhole 231. Detector 250 may be a single element detector providing intensity values, such that image data may be collected in the form of a 2-D array. Otherwise, detector 250 may be a multi-element detector such as a spectrograph providing spectral data, such that image data may be collected in the form of a 3-D data cube, with the third dimension being a spectroscopic dimension. The image reconstruction algorithm is the same in each case, although a longer time is generally needed in the case of spectral data. For Raman spectroscopic imaging, detector 250 may be a commercially available spectrograph such as a DXR2 spectrograph. Confocal microscope 200 may operate as a laser scanning device, according to which the sample is maintained in a fixed position, and a given image is built, or its associated illumination data is obtained, pixel-by-pixel, by scanning the focused fringe pattern for that image over the sample. Alternatively, confocal microscope 200 may operate as a sample scanning device to obtain this pixel information, according to which the laser is maintained in a fixed position and the sample is moved, for example in two or possibly three dimensions using motorized stage 227 (e.g., an XYZ motorized stage). Processor 260 (e.g., within a personal computer, PC) may be used to coordinate operations of, and be operatively linked to (e.g., electrically or wirelessly) Gaussian blurring filter 208, SLM 209, laser scanning module 219, motorized stage 227, and/or detector 250 and may contain programs of instructions for collecting and processing illumination data and for carrying out image reconstruction algorithms.

By using different focused fringe patterns having different rotational axis angles of the beams and/or different phase shifts between the two beams, illumination data for multiple "raw" images, with each raw image corresponding to each focused fringe pattern used to illuminate (scan or sweep) the sample at multiple points, can be obtained. This raw image data may, in turn, be used to reconstruct a super-resolved, synthesized image with greater resolution compared to that obtained with conventional confocal microscopy. Representative methods for imaging a sample may therefore comprise illuminating a plurality of points of the sample, such as over an area of interest of the sample, with a first focused fringe pattern and at least one different focused fringe pattern, with each of these being generated at each of the plurality of points by interference of light beams (e.g., from a collimated laser source). These beams may be emitted through a microscope objective, for example at opposite ends of a diameter of its back or rear aperture. The beams illuminate less than the entire aperture in order to provide "structured illumination." For the first focused fringe pattern, the light beams are directed to separate illumination areas of the microscope objective that may be deemed "first separate illumination areas," used to generate this pattern. The first separate illumination areas may have a rotational axis as described above, which may be deemed a "first rotational axis," and the light beams may be shifted in phase relative to one another by a "first phase." As described above, the corresponding modifiers "second," "third," "fourth," "fifth," and "sixth" may be used as a convenient way for referring to separate illumination areas, rotational axes, and phases, of respective "second," "third," "fourth," "fifth," and "sixth" focused fringe patterns, without these modifiers requiring any particular order in which these are used for sample imaging and also without these modifiers requiring separate illumination areas, rotational axes, and phases to be different. Possible values for rotational axis angles and phase shifts include 0. Nor do any of these modifiers of a higher ordinal number necessarily require modifiers of all lower ordinal numbers. Therefore, for example, a sample may be imaged with "first," "second," "fifth," and "sixth" focused fringe patterns as described herein, without necessarily being imaged by "third" and "fourth" focused fringe patterns as described herein.

In addition to illuminating the plurality of points of the sample with a first focused fringe pattern, representative methods further comprise illuminating these points with at least one different focused fringe pattern with the light beams (and consequently the light projected onto the back aperture at the separate illumination areas) being shifted in phase relative to one another by a different phase, relative to the first phase. For this at least one different focused fringe pattern having a different phase shift relative to the first focused fringe pattern, the rotational axis angle may be the same as, or different from, the rotational axis angle of the first focused fringe pattern. That is, with respect to this at least one different focused fringe pattern, either (i) the same separate illumination areas of the microscope objective are used, having the same rotational axis that is not angled relative to (i.e., substantially coincides with) the first rotational axis, or (ii) different separate illumination areas of the microscope objective are used, having a different rotational axis that is angled relative to the first rotational axis, thereby causing a difference in the direction at which the light beams are focused on the sample. According to particular embodiments (falling within case (i) above), the at least one different focused fringe pattern may be a second focused fringe pattern having a different phase shift relative to the first focused fringe pattern. According to other particular embodiments, the at least one different focused fringe pattern may be two or more, such as two, three, four, or five different focused fringe patterns. Therefore, a total of at least two different focused fringe patterns (the first focused fringe pattern and the at least one different focused fringe pattern), such as a total of three, four, five, or six different focused fringe patterns, differing with respect to their characteristic rotational axis angle (angle of the rotational axis of the separate illumination areas for a given focused fringe pattern) or their characteristic phase shift (phase by which the light beams, projected onto the separate illumination areas, are shifted for a given focused fringe pattern) as described herein, or both, are used to illuminate the sample.

This illumination (scanning or sweeping), performed a plurality of times, allows for the acquisition, or obtaining, of corresponding illumination data for each of a plurality of raw images, corresponding to each of the plurality of focused fringe patterns, i.e., the first focused fringe pattern and the at least one different focused fringe pattern. As described above, the illumination data may be obtained, for example, from a single element detector (for collecting data in the form of a 2-D array) or a spectrograph (for collecting data in the form of a 3-D data cube). Regardless of the particular detector, a super-resolved, synthesized image may then be reconstructed from the illumination data for each of the plurality of raw images, according to the following image reconstruction algorithm:

$$I_{syn} = \frac{1}{n_{images}} \sum_i \sum_j I_{raw_{i,j}} + \frac{1}{A} \sum_i \sum_j I_{raw_{i,j}} * \cos(\text{phase}),$$

where $I_{syn}$ is the synthesized image and $n_{images}$ is the number raw images, corresponding to the number of focused fringe patterns used. For each of these focused fringe patterns, namely the first focused fringe pattern and the at least one different focused fringe pattern, i is an index corresponding to its characteristic rotational axis angle, and j is an index corresponding to its characteristic phase shift. The indices i, j in the above equation may have respective X and Y unique numbers (e.g., rotational axis angle index i may have 3 numbers: 1, 2, and 3; and phase shift index j may have 2 numbers: 1 and 2), corresponding to respective X and Y unique values of rotational axis angles and phase shifts. For example, a set of X·Y focused fringe patterns may be utilized, having X unique rotational axis angles and Y unique phase shifts, such as in the case of 6 focused fringe patterns having 3 unique rotational angles and 2 unique phase shifts. The term $I_{raw_{i,j}}$ is the illumination data for each of the plurality of raw images, having the corresponding rotational axis angle and phase shift indices i, j. A is a factor representing a contrast for the focused fringe pattern, which can be the amplitude of the sine wave of the interference pattern generated on the sample, and phase is the value of the phase shift (in radians).

In view of the second term in the sum above, which is weighted by a factor of cos(phase), certain phase shifts, and particularly those for which the value of this factor is relatively low, provide relatively little contribution to the synthesized image $I_{syn}$. That is, in some embodiments the marginal improvement in resolution of the synthesized image, resulting from additional illumination data corresponding to focused fringe patterns with characteristic phase shifts such that cos(phase) is relatively low, does not justify the additional acquisition and processing time associated with collecting this illumination data. In certain embodiments, none of the focused fringe patterns have characteristic phase shifts, or otherwise for none of the first and the at least one different focused fringe pattern the separate illumination areas are shifted by a phase, having a cosine of 0. For example, such embodiments exclude the use of a focused fringe pattern, in generating $I_{syn}$, having a characteristic phase shift of $\pi/2$ or $3\pi/2$. In certain, more particular, embodiments, the use of broader possibilities of focused fringe patterns may be excluded. For example, according to such embodiments, none of the focused fringe patterns have characteristic phase shifts, or otherwise for none of the first and the at least one different focused fringe pattern the separate illumination areas are shifted by a phase, having a cosine with an absolute value of less than 0.5. Such embodiments exclude the use of focused fringe patterns, in generating $I_{syn}$, having a characteristic phase shifts, for example, in the range from $\pi/3$ to $2\pi/3$ or from $5\pi/3$ to $5\pi/3$.

As described above, illuminating the sample with a first focused fringe pattern having a characteristic rotational axis angle and phase shift, in addition to a second (or third or fourth) focused fringed pattern having the same rotational axis angle but a different phase shift, may be sufficient for providing image resolution enhancement along the direction of that rotational axis angle. In particular embodiments, therefore, the least one different focused fringe pattern may be a second focused fringe pattern for which the light beams are shifted by a second phase that differs from the first phase, but for which are second separate illumination areas are the same as those for the first focused fringe pattern, such that these separate illumination areas have a second rotational axis that is not angled relative to (substantially coincides with) the first rotational axis. In preferred embodiments, the second phase differs from the first phase by $\pi$, such as in the case of the first phase shift (or phase by which the light beams generating the first focused fringe pattern are shifted relative to one another) being zero (0) and the second phase shift (or phase by which the light beams generating the second focused fringe pattern are shifted relative to one another) being pi ($\pi$).

Likewise, if image resolution enhancement is desired along another direction, third and fourth focused fringe patterns may be used, having another characteristic rotational axis angle but different characteristic phase shifts. According to representative imaging methods, the at least one different focused fringe pattern may therefore include using not only a second focused fringe pattern, but also third and/or fourth focused fringe patterns, and preferably both third and fourth focused fringe patterns. For the third focused fringe pattern, the light beams may be shifted by a third phase that is substantially the same as the first phase, but third separate illumination areas may have a third rotational axis that is angled relative to both the first rotational axis and the second rotational axis. For the fourth focused fringe pattern, the light beams may be shifted by a fourth phase that is substantially the same as the second phase, but fourth separate illumination areas may have a fourth rotational axis that is not angled relative to (substantially coincides with) the third rotational axis. In preferred embodiments, the fourth phase differs from the third phase by $\pi$, such as in the case of the third phase shift (or phase by which the light beams generating the third focused fringe pattern are shifted relative to one another) being zero (0) and the fourth phase shift (or phase by which the light beams generating the fourth focused fringe pattern are shifted relative to one another) being pi ($\pi$). In other preferred embodiments, the third rotational axis, or otherwise both the third and fourth rotational axes, is/are angled from about $\pi/6$ to about $\pi/2$, such as from about $\pi/4$ to about $\pi/2$, relative to the first rotational axis, or otherwise relative to both the first and the second rotational axis. For example, the first and/or second rotational axes may have a reference rotational axis angle of zero (0), and the third and/or fourth rotational axes may be angled at $\pi/3$ relative to the first and/or second rotational axes.

If image resolution enhancement is desired along yet another direction, fifth and sixth focused fringe patterns may be used, having another characteristic rotational axis angle but different characteristic phase shifts. According to representative imaging methods, the at least one different focused fringe pattern may therefore include not only second, third, and fourth focused fringe patterns, but also fifth and/or sixth focused fringe patterns, and preferably both fifth and sixth focused fringe patterns. For the fifth focused fringe pattern, the light beams may be shifted by a fifth phase that is substantially the same as the first and third phases, but fifth separate illumination areas may have a fifth rotational axis that is angled relative to all of the first, second, third, and fourth rotational axes. For the sixth focused fringe pattern, the light beams may be shifted by a sixth phase that is substantially the same as the second and fourth phases, but sixth separate illumination areas may have a sixth rotational axis that is not angled relative to (substantially coincides with) the fifth rotational axis. In preferred embodiments, the sixth phase differs from the fifth phase by $\pi$, such as in the case of the fifth phase shift (or phase by which the light beams generating the fifth focused fringe pattern are shifted relative to one another) being zero (0) and the sixth phase shift (or phase by which the light beams generating the sixth focused fringe pattern are shifted relative to one another) being pi ($\pi$). In other preferred embodiments, the fifth rotational axis, or otherwise both the fifth and sixth rotational axes, is/are angled from about $\pi/2$ to about $5\pi/6$, such as from about $\pi/2$ to about $3\pi/4$, relative to the first rotational axis, or otherwise relative to both the first and the second rotational axis. For example, the first and/or second rotational axes may have a reference rotational axis angle of zero (0), and the fifth and/or sixth rotational axes may be angled at $2\pi/3$ relative to the first and/or second rotational axes.

Accordingly, representative sample imaging methods described herein comprise obtaining illumination data for each of a plurality of raw images, with each raw image corresponding to a given one of a set of focused fringe patterns. Each focused fringe pattern is generated by interference of a pair of light beams emitted through a microscope objective to illuminate a plurality of points of the sample, for example by scanning the pattern about a fixed sample, to perform laser scanning microscopy, or otherwise by moving the sample about a fixed pattern, to perform sample scanning microscopy. The set of focused fringe patterns may comprise X·Y members that are combinations of, or define a matrix of, (i) X unique angles at which rotational axes of the light beams are oriented, and (ii) Y unique phases by which the light beams are shifted. Advantageously, by judiciously selecting the corresponding Y unique values of phase shift, as described herein, enhanced image resolution is obtained with reduced time and data processing, by limiting or eliminating the collection of illumination data that in conventional methods provides little or no additional benefit. For example, selecting a phase difference corresponding to a difference in values for phase shift indices 1 and 2 of $\pi$ may be desirable if the cosines of these values are significant (e.g., in the case of phase shift index 1 having a value of 0 and phase shift index 2 having a value of $\pi$), but undesirable if the cosines of these values less significant (e.g., in the case of phase shift index 1 having a value of π/2 and phase shift index 2 having a value of 3π/2). Accordingly, it can be appreciated that the mere selection of a difference in values for phase shift indices, without more, may in some cases be insufficient. With the proper selection of index values, however, a sample may be imaged according to methods described herein with no more than two unique values for phase shift, and/or with no more than six, or even no more than four, focused fringe patterns in total.

In representative embodiments, for example, a sample may be imaged with two, four, or six of focused fringe patterns 1-6 as characterized in Table 1 below with respect to their rotational axis angle index i and phase shift index j.

TABLE 1

| Focused Fringe Pattern | Rotational Axis Angle Index, i | Phase Shift Index, j |
|---|---|---|
| 1 | 1 | 1 |
| 2 | 1 | 2 |
| 3 | 2 | 1 |
| 4 | 2 | 2 |
| 5 | 3 | 1 |
| 6 | 3 | 2 |

For example, a sample may be imaged with focused fringe patterns 1-2 only, 1-4 only, or 1-6 only. Values for rotational axis angle index i may be, for example, 0, π/3, and 2π/3, and values for phase shift index j may be, for example 0 and π. In this case, the specific focused fringe patterns 1-6 above could be more particularly characterized by the values of the rotational axis angles and phase shifts, for the respective rotational axis indices i and phase shift indices j in the Table 1, with these values provided in Table 2 below.

TABLE 2

| Focused Fringe Pattern | Rotational Axis Angle Value | Phase Shift Value |
|---|---|---|
| 1 | 0 | 0 |
| 2 | 0 | π |
| 3 | π/3 | 0 |
| 4 | π/3 | π |
| 5 | 2π/3 | 0 |
| 6 | 2π/3 | π |

Further embodiments of the invention relate to apparatuses for performing Raman spectroscopy or fluorescence microscopy according to any of the imaging methods described herein. Such apparatuses may include components such as a programmable spatial light modulator (SLM) for modulating phases of the light beams that are projected onto the back aperture of the microscope objective, as described herein, and that interfere to generate focused fringe patterns on the sample. Preferably, the SLM displays a phase grating that causes the light beams to pass through separate illumination areas of the microscope objective, with these separate areas being non-circular. The apparatus, or more particularly software of a processor used in the apparatus, may further perform Gaussian blurring (according to a software algorithm known as a Gaussian blurring filter) for reducing or eliminating diffraction along edges of these non-circular, separate illumination areas.

Overall, aspects of the invention are directed to advantages, in sample imaging applications, that are attained in directing laser light beams to separate illumination areas of a back aperture of a microscope, with these areas in some embodiments being non-circular (e.g., in the shape of slits or circular segments). Compared to the use of circular illumination areas, for a given displacement (distance) across the back aperture, two non-circular illumination areas can increase light throughput. For example, along a horizontal displacement axis 16 as shown in FIGS. 1A and 1B, the distance between the two circles (FIG. 1A) is the same as the distance between the two non-circular slits (FIG. 1B). However, in the case of the two non-circular slits (which are circular segments in this particular embodiment), substantially more light enters the microscope objective along the vertical direction. For example, at least a four-fold increase in light intensity of the back aperture of this objective may be achieved. Alternatively, compared to the use of circular illumination areas, for a given light throughput, two non-circular illumination areas can increase displacement that provides a high quality (finer) sinusoid resulting from the interference. Other aspects are associated with advantages resulting from efficiencies in illumination data collection and processing, by the judicious selection of focused fringe pattern profiles for sample scanning. Those having skill in the art, with the knowledge gained from the present disclosure, will recognize that various changes can be made to the disclosed imaging methods and apparatuses in attaining these and other advantages, without departing from the scope of the present invention. Accordingly, it should be understood that the features described herein are susceptible to changes or substitutions. The specific embodiments illustrated and described herein are for illustrative purposes only, and not limiting of the invention as set forth in the appended claims.

The following examples are set forth as representative of the present invention. These examples are not to be construed as limiting the scope of the invention as these and other equivalent embodiments will be apparent in view of the present disclosure and appended claims.

Example 1

Simulation Studies

Figure 3:
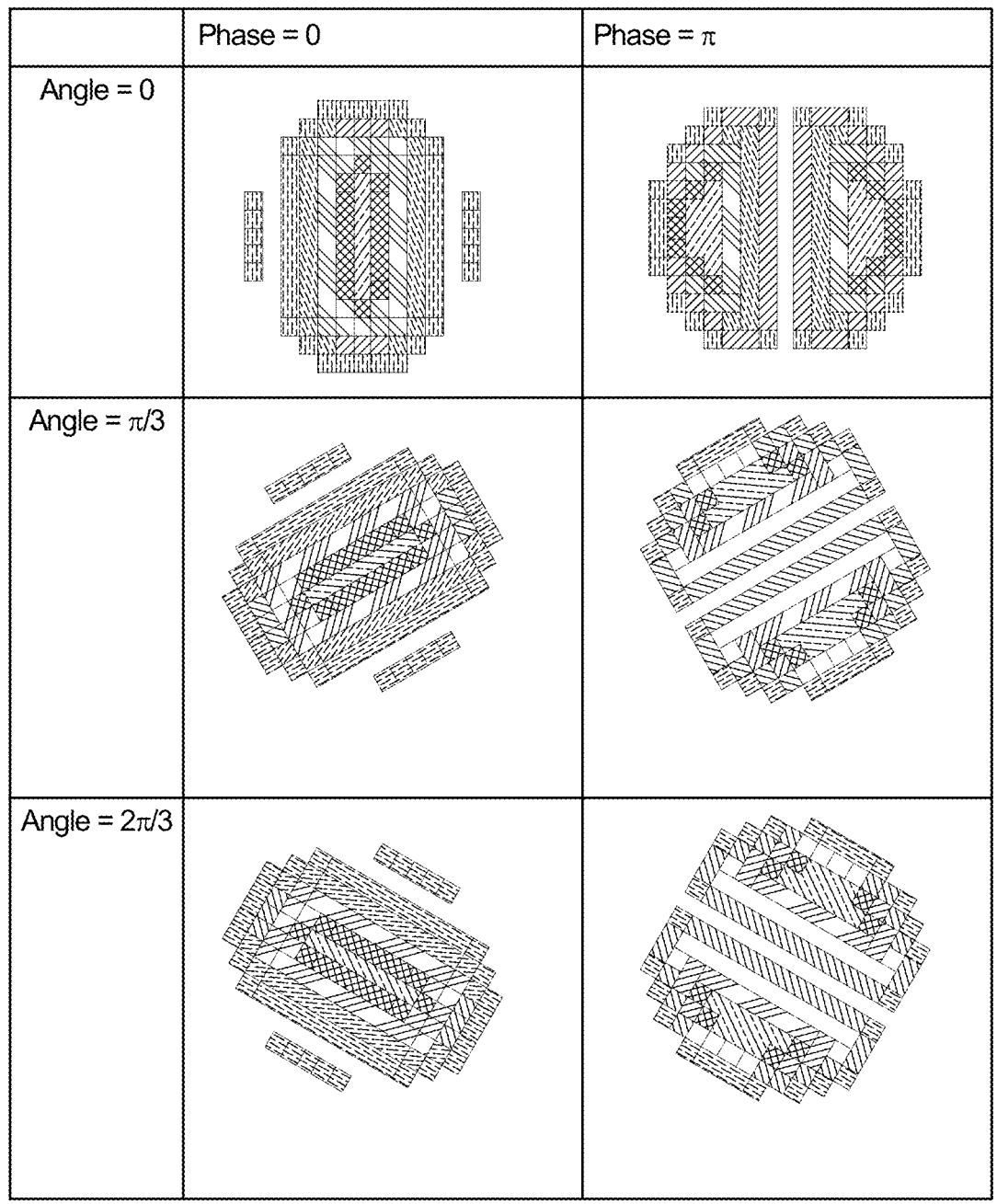
FIG. 3 illustrates simulated point spread functions for a confocal SIM with a 532 nm wavelength illumination through a 100×, 0.7 NA objective, focused through a 75 mm focal length lens into a 25 μm pinhole. The six simulated images were based on using three different angles (0, π/3, 2π/3) of the light beams, and for each angle, the illumination pattern of the two light beams being shifted relative to each other by a phase of 0 and π.

The imaging of a true sample, having a "ground truth image" was simulated according to the improved imaging methods described herein with confocal-SIM, and compared to conventional CLSM. The simulation results were obtained using an optical propagation library, available as online as "PROPER". This set of routines, for simulating the propagation of light through an optical system using Fourier transform algorithms (Fresnel, angular spectrum methods), has been thoroughly validated as a physical optical propagation tool, and is commonly used by astronomers in modeling the performance of telescopes. This library was used to simulate, in particular, the confocal and the confocal-SIM point spread functions for a 532 nm laser through a 100×, 0.7 NA objective, focused through a 75 mm focal length lens into a 25 µm confocal pinhole. FIG. 3 illustrates the simulated point spread functions of this confocal SIM example, for three different angles (0, π/3, 2π/3) of the light beams, and for each angle, the light beams being shifted relative to each other by a phase of 0 and π. Then, the resulting image collected was simulated using these patterns by taking the convolution of the point spread function with the ground truth image. In the case of the raw confocal SIM image at angle 0, phase shift π, this image by itself was of little use. It was only when raw image data at all angles and phases was collected and used to reconstruct the super-resolved image according to the image reconstruction algorithm described herein, that the improvement over conventional CLSM was apparent.

Figure 4:
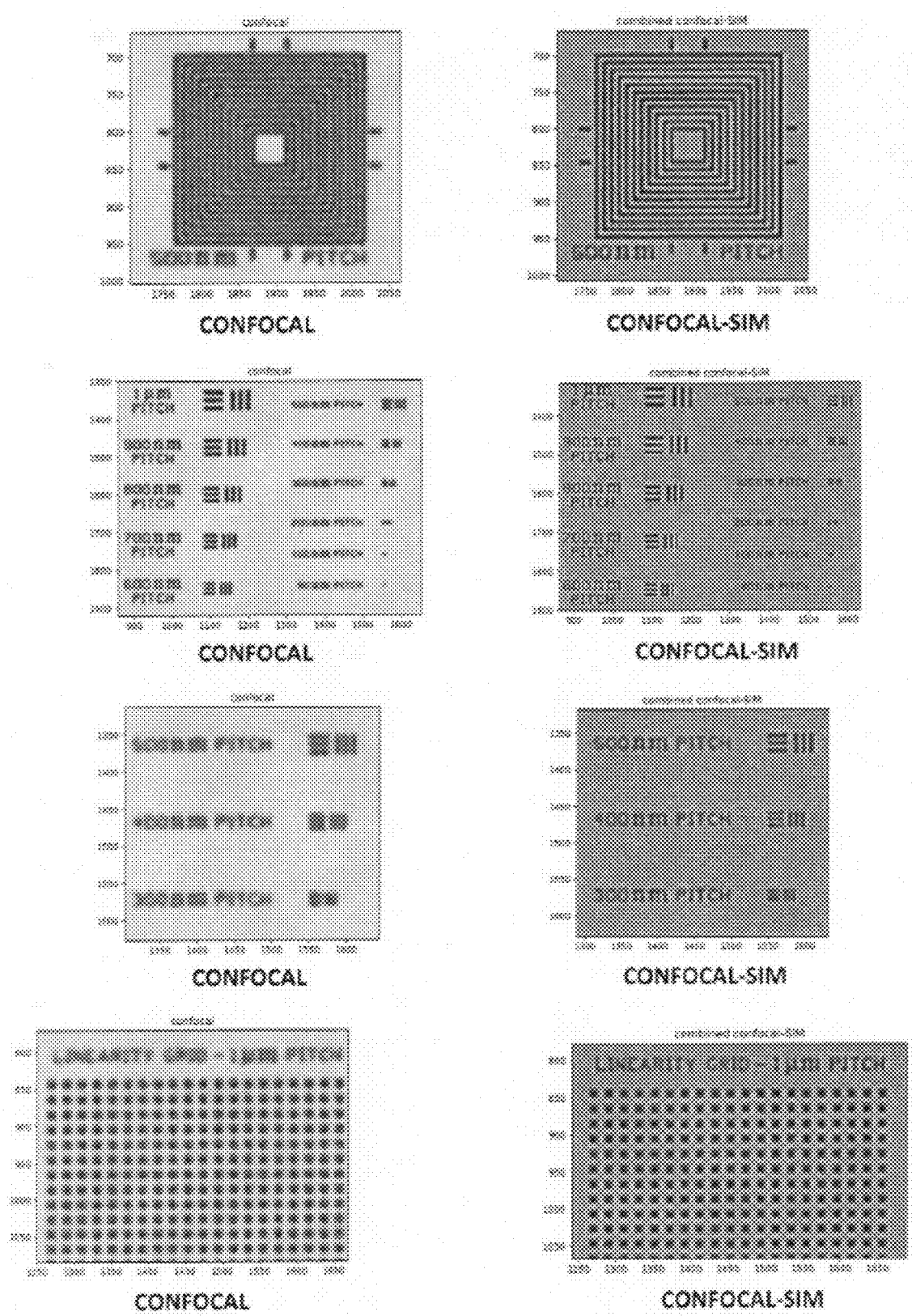
FIG. 4 illustrates simulated sample images using conventional CLSM, as well as the same simulated images, but utilizing confocal-SIM to improve resolution. The improvement was obtained by reconstructing a super-resolved image, using the six combinations of angle and phase as shown in FIG. 3, for illumination patterns being swept over the entire sample.

FIG. 4 illustrates a collection of simulated sample images using conventional CLSM, as well as the same simulated images, but utilizing confocal-SIM to improve resolution. The improvement was obtained by reconstructing a super-resolved image, using the six combinations of angle and phase as shown in FIG. 3, for illumination patterns being swept over the entire sample. The image reconstruction algorithm was as described above. The simulation work therefore demonstrated successful simulation of confocal SIM images using the improvements described above on a simulated microscope resolution standard. In other studies, it was proven in both 1D and 2D simulations that only 2 different phase shifts of illumination were necessary at a given rotational axis angle.

Example 2

Experimental Demonstration

A prototype microscope for performing confocal SIM was constructed according to the configuration illustrated in FIG. 2. The dichroic mirror provided the ability to observe the laser spot on the sample, using the microscope camera. This camera was used to acquire images of the spot generated with the SIM patterns from the SLM, in order to prove that same focused fringe patterns were generated, as in the physical optical propagation simulation studies described in Example 1. This was based on a side-by side comparison with the simulation results, in consideration of the circular boundaries around the images obtained in this experimental demonstration, to help indicate approximately the alignment with the confocal pinhole. In the simulation studies, the simulated SIM laser patterns already accounted for the application of the confocal mask, which was the reason for the circular outside shapes of these patterns, as shown in FIG. 3.

Using a Pelcotec™ CDMS (Critical Dimension Magnification Standard by Ted Pella, Inc.), super resolution with confocal SIM, in both a line scan as well as a full 2D image, was successfully demonstrated. The CDMS sample had 500 nm spaced lines, which a confocal imaging system was unable to resolve. In contrast, when imaging using confocal SIM, the images could be resolved. Moreover, when imaging with 532 nm excitation using a 100×, 0.9 NA objective, the calculated confocal resolution, according to the equation given above in the Background section, would be 296 nm. This can be confirmed experimentally using a carbon nanotube sample and was confirmed on a confocal system by achieving a confocal (non-SIM) resolution of 279 nm. With the same system, using the same excitation wavelength, objective, and carbon nanotube sample, when imaging using combined confocal-SIM, an improved resolution of 186 nm was achieved.

What is claimed is:

1. A method of imaging a sample, the method comprising:
    illuminating a plurality of points of the sample with a first focused fringe pattern generated at each of the plurality of points by interference of light beams emitted through a microscope objective;
    wherein, for the first focused fringe pattern, first separate illumination areas of the microscope objective have a first rotational axis and the light beams are shifted in phase relative to one another by a first phase;
    the method further comprising illuminating the plurality of points with at least one different focused fringe pattern, wherein the light beams are shifted in phase relative to one another by a different phase, relative to the first phase, and wherein either (i) same separate illumination areas of the microscope objective have a same rotational axis that is not angled relative to the first rotational axis, or (ii) different separate illumination areas of the microscope objective have a different rotational axis that is angled relative to the first rotational axis
    wherein one or both of said separate illumination areas are non-circular.

2. The method of claim 1, further comprising obtaining, from a single element detector or a spectrograph, illumination data for each of a plurality of raw images, corresponding to each of said first focused fringe pattern and said at least one different focused fringe pattern.

3. The method of claim 2, further comprising reconstructing a super-resolved, synthesized image from said illumination data for each of said plurality of raw images, according to:

$$I_{syn} = \frac{1}{n_{images}} \sum_i \sum_j I_{raw_{i,j}} + \frac{1}{A} \sum_i \sum_j I_{raw_{i,j}} * \cos(\text{phase})$$

wherein $I_{syn}$ is the synthesized image and $n_{images}$ is a number of each of said plurality of raw images, and
wherein for each of said first focused fringe pattern and said at least one different focused fringe pattern:
    i is an index corresponding to a rotational axis angle;
    j is an index corresponding to a phase shift of said light beams relative to one another;
    $I_{raw_{i,j}}$ is said illumination data for each of said plurality of raw images, having index i corresponding to said rotational axis angle and index j corresponding to said phase shift;
    A is a factor representing a contrast for the focused fringe pattern,
    phase is said phase shift.

4. The method of claim 1, wherein the separate illumination areas include largest inscribed circles having centers being substantially collinear with a center of a rear aperture of the microscope objective.

5. The method of claim 4, wherein the separate illumination areas each further include illumination augmentation areas exterior to said largest inscribed circles.

6. The method of claim 5, wherein the illumination augmentation areas represent at least about 50% of the separate illumination areas.

7. The method of claim 5, wherein the illumination areas are shaped as slits conforming to opposite side portions of a rear circular aperture of the microscope objective.

8. The method of claim 1, wherein for said at least one different focused fringe pattern, said light beams are modulated in phase using a programmable spatial light modulator.

9. The method of claim 1, wherein, for none of said first and said at least one different focused fringe patterns, said separate illumination areas are shifted by a phase having a cosine of 0.

10. The method of claim 9, wherein, for none of said first and said at least one different focused fringe patterns, said separate illumination areas are shifted by a phase having a cosine with an absolute value of less than 0.5.

11. The method of claim 1, wherein, said at least one different focused fringe pattern is a second focused fringe pattern for which the light beams are shifted by a second phase that differs from said first phase and said same separate illumination areas are second separate illumination areas having a second rotational axis that is not angled relative to the first rotational axis.

12. The method of claim 11, wherein said at least one different focused fringe pattern further includes:
a third focused fringe pattern for which the light beams are shifted by a third phase that is substantially the same as said first phase and for which third separate illumination areas have a third rotational axis that is angled relative to said first rotational axis and said second rotational axis.

13. The method of claim 12, wherein said at least one different focused fringe pattern further includes:
a fourth focused fringe pattern for which the light beams are shifted by a fourth phase that is substantially the same as said second phase and for which fourth separate illumination areas have a fourth rotational axis that is not angled relative to said third rotational axis.

14. The method of claim 13, wherein said second phase differs from said first phase by $\pi$.

15. The method of claim 14, wherein said first phase is 0 and said second phase is $\pi$.

16. The method of claim 13, wherein said at least one different focused fringe pattern further includes:
a fifth focused fringe pattern for which the light beams are shifted by a fifth phase that is substantially the same as said first phase and said third phase and for which fifth separate illumination areas have a fifth rotational axis that is angled relative to said first, second, third, and fourth rotational axes; and
a sixth focused fringe pattern for which the light beams are shifted by a sixth phase that is substantially the same as said second phase and said fourth phase, and for which sixth separate illumination areas have a sixth rotational axis that is not angled relative to said fifth rotational axis.

17. The method of claim 16, wherein said first, third, and fifth phases are 0, and wherein said second, fourth, and sixth phases are $\pi$.

18. The method of claim 16, wherein said third rotational axis is angled from about $\pi/6$ to about $\pi/2$, relative to said first rotational axis, and wherein said fifth rotational axis is angled from about $\pi/2$ to about $5\pi/6$ relative to said first rotational axis.

19. A method of imaging a sample, the method comprising:
obtaining illumination data for each of a plurality of raw images, each raw image corresponding to a given one of a set of focused fringe patterns, each being generated by interference of a pair of light beams emitted through a microscope objective to illuminate a plurality of points of the sample,
wherein the set of focused fringe patterns comprises X·Y members that are combinations of (i) X phases by which the light beams are shifted, and (ii) Y angles at which rotational axes of the light beams are oriented, wherein the set includes no more than two different values for X; and
wherein a light beam of the pair of light beams illuminates a non-circular illumination area of the microscope objective for at least one of the focused fringe patterns.

20. An apparatus for performing Raman spectroscopy or fluorescence microscopy, said apparatus comprising a programmable spatial light modulator (SLM) for modulating phases of said light beams and being configured for performing the method of claim 1.

21. The apparatus of claim 20, wherein the SLM displays a phase grating that causes the light beams to pass through the non-circular, separate illumination areas of the microscope objective.

22. The apparatus of claim 21, configured for performing Gaussian blurring for smoothing the non-circular, separate illumination areas.

* * * * *